US012189316B2

(12) United States Patent
Patla et al.

(10) Patent No.: US 12,189,316 B2
(45) Date of Patent: Jan. 7, 2025

(54) PRINTING APPARATUS WITH LEAKAGE PATH FOR CORONA DISCHARGE

(71) Applicant: Hewlett-Packard Development Company, L.P., Spring, TX (US)

(72) Inventors: Israel Patla, Nes Ziona (IL); Chen Zigdon, Nes Ziona (IL); Faina Kogan, Nes Ziona (IL); Aviad Eliav, Nes Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/042,740

(22) PCT Filed: Aug. 25, 2020

(86) PCT No.: PCT/US2020/047821
§ 371 (c)(1),
(2) Date: Feb. 23, 2023

(87) PCT Pub. No.: WO2022/046038
PCT Pub. Date: Mar. 3, 2022

(65) Prior Publication Data
US 2023/0333501 A1 Oct. 19, 2023

(51) Int. Cl.
*G03G 15/16* (2006.01)

(52) U.S. Cl.
CPC ................................ *G03G 15/1605* (2013.01)

(58) Field of Classification Search
CPC ... G03G 15/1605; G03G 15/10; G03G 15/161
See application file for complete search history.

(56) References Cited

U.S. PATENT DOCUMENTS

| | | | | |
|---|---|---|---|---|
| 3,797,927 | A | 3/1974 | Takahashi et al. | |
| 4,684,238 | A | 8/1987 | Till et al. | |
| 4,984,025 | A | 1/1991 | Landa et al. | |
| 5,361,125 | A * | 11/1994 | Fletcher | G03G 15/161 399/311 |
| 5,732,314 | A | 3/1998 | Tsukida et al. | |
| 7,346,302 | B2 | 3/2008 | Sato et al. | |
| 2009/0074482 | A1* | 3/2009 | Oyama | G03G 15/1605 399/313 |
| 2009/0233216 | A1* | 9/2009 | Teshima | G03G 15/10 430/117.5 |
| 2012/0270333 | A1 | 10/2012 | Dejoseph et al. | |

(Continued)

FOREIGN PATENT DOCUMENTS

| | | | |
|---|---|---|---|
| JP | 2018-141863 | A | 9/2018 |
| WO | 90/08984 | A1 | 8/1990 |
| WO | 2007/120142 | A1 | 10/2007 |

(Continued)

*Primary Examiner* — Sandra Brase
(74) *Attorney, Agent, or Firm* — Jordan IP Law, LLC

(57) ABSTRACT

A printing apparatus has a photo imaging plate to be held at a first voltage having a first polarity, and an intermediate transfer member to receive an intermediate image from the photo imaging plate. The intermediate transfer member is to be held at a second voltage having a second polarity opposite to the first polarity. An electrically conductive member is disposed between the photo imaging plate and the intermediate transfer member.

15 Claims, 5 Drawing Sheets

(56) References Cited

U.S. PATENT DOCUMENTS

2018/0004110 A1* 1/2018 Ron ....................... G03G 15/10
2019/0146381 A1* 5/2019 Libster ................. G03G 15/161
399/308

FOREIGN PATENT DOCUMENTS

WO 2016/088316 A1 6/2016
WO 2018/014957 A1 1/2018

* cited by examiner

PRINTING APPARATUS WITH LEAKAGE PATH FOR CORONA DISCHARGE

BACKGROUND

Liquid electrophotographic printing, also referred to as liquid electrostatic printing, uses liquid print fluid to form images on a print medium. A liquid electrophotographic printer may use digitally controlled lasers to create a latent image in a charged surface of an imaging element such as a photo imaging plate (PIP). In this process, a uniform static electric charge is applied to the photo imaging plate and the lasers dissipate charge in certain areas creating the latent image in the form of an invisible electrostatic charge pattern conforming to one colour separation of the image to be printed. An electrically charged print fluid, which may be in the form of ink, is then applied and attracted to the partially charged surface of the photo imaging plate, to form an intermediate image.

In some liquid electrophotographic printers, a transfer member, such as an intermediate transfer member (ITM) is used to transfer an intermediate image to a print medium. For example, an intermediate image comprising print fluid aligned according to a latent image, may be transferred from the photo imaging plate to a transfer blanket of the intermediate transfer member. From the intermediate transfer member, the intermediate image is transferred to a substrate, which is placed into contact with the transfer blanket, such that a printed image is formed on the substrate.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
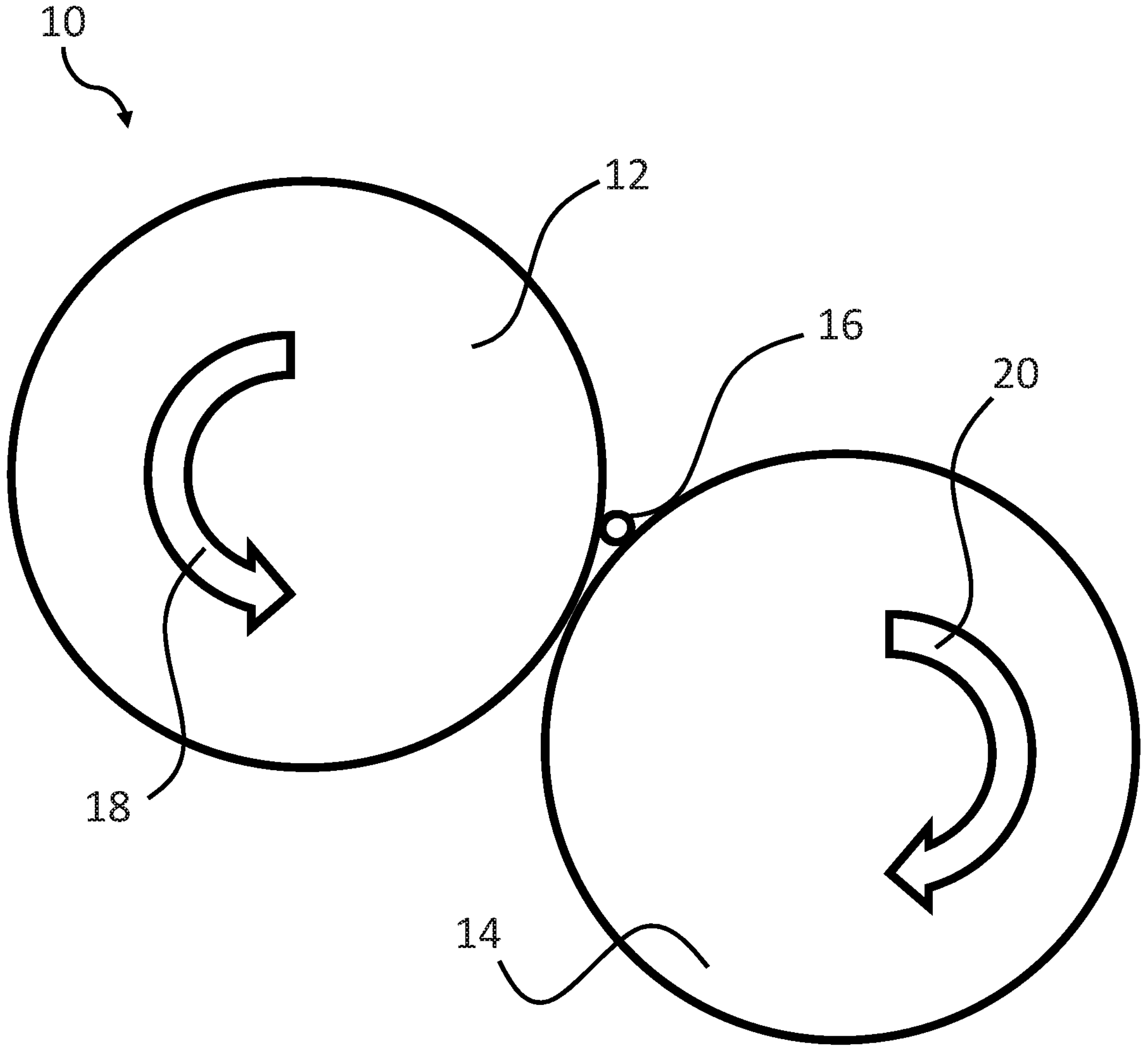
FIG. 1 is a schematic diagram showing a printing apparatus according to an example.

An example of a printing apparatus, generally designated 10, is shown schematically in FIG. 1. In some examples, the printing apparatus 10 is part of a liquid electrophotographic printer.

The printing apparatus 10 comprises a photo imaging plate (PIP) 12, an intermediate transfer member 14, and an electrically conductive member 16. The photo imaging plate 12 is to be held at a first voltage having a first polarity in use. In some examples the first voltage may comprise a negative voltage of around −900V. The photo imaging plate 12 is to hold an intermediate image in use, for example by attracting charged print fluid particles from an image development unit. In some examples the intermediate image is held at a negative voltage in the region of −50V. An intermediate image in some examples herein may comprise an image present at a stage in the printing apparatus 10 between a latent image formed on the photo imaging plate 12 and a printed image formed on a substrate.

The intermediate transfer member 14 is to receive the intermediate image from the photo imaging plate 12, and is to be held at a second voltage having a second polarity opposite to the first polarity. In some examples the second voltage may comprise a positive voltage in the region of +600-650V. The intermediate transfer member 14 is to transfer the received intermediate image to a substrate in use, such that a printed image is formed on the substrate. The printed image in some examples may be a modified version of the intermediate image, for example a version of the intermediate image that has been modified by the application of heat thereto.

The applicant has found that during use of the printing apparatus 10 absent the electrically conductive member 16, corona discharge may occur between the photo imaging plate 12 and the intermediate transfer member 14 in view of the voltage difference between the photo imaging plate 12 and the intermediate transfer member 14. Such corona discharge may have an impact on the intermediate transfer member 14, which may lead to increased wear and reduced maintenance interval times. In particular, corona discharge may result in the formation of a high concentration of hydroxyl radicals, which may oxidise an outer surface of the intermediate transfer member 14. This may increase the surface tension of an outer surface of the intermediate transfer member 14 with the number of impressions printed. Consequently, print fluid releaseability from the intermediate transfer member 14 to a substrate may reduce as the number of impressions printed increases.

By placing the electrically conductive member 16 between the photo imaging plate 12 and the intermediate transfer member 14, the applicant has found that the effects of corona discharge on the intermediate transfer member 14 may be reduced, which may lead to reduced wear, for example reduced oxidation of an outer surface of the intermediate transfer member, and increased maintenance interval times. In some examples, the electrically conductive member 16 may define a leakage path for corona discharge between the photo imaging plate 12 and the intermediate transfer member 14. In some examples, such as that of FIG. 1, the electrically conductive member 16 is disposed between the photo imaging plate 12 and the intermediate transfer member 14 such that the electrically conductive member 16 does not contact the photo imaging plate 12. In some examples, such as that of FIG. 1, the electrically conductive member 16 is disposed between the photo imaging plate 12 and the intermediate transfer member 14 such that the electrically conductive member 16 does not contact the intermediate transfer member 14.

Figure 2:
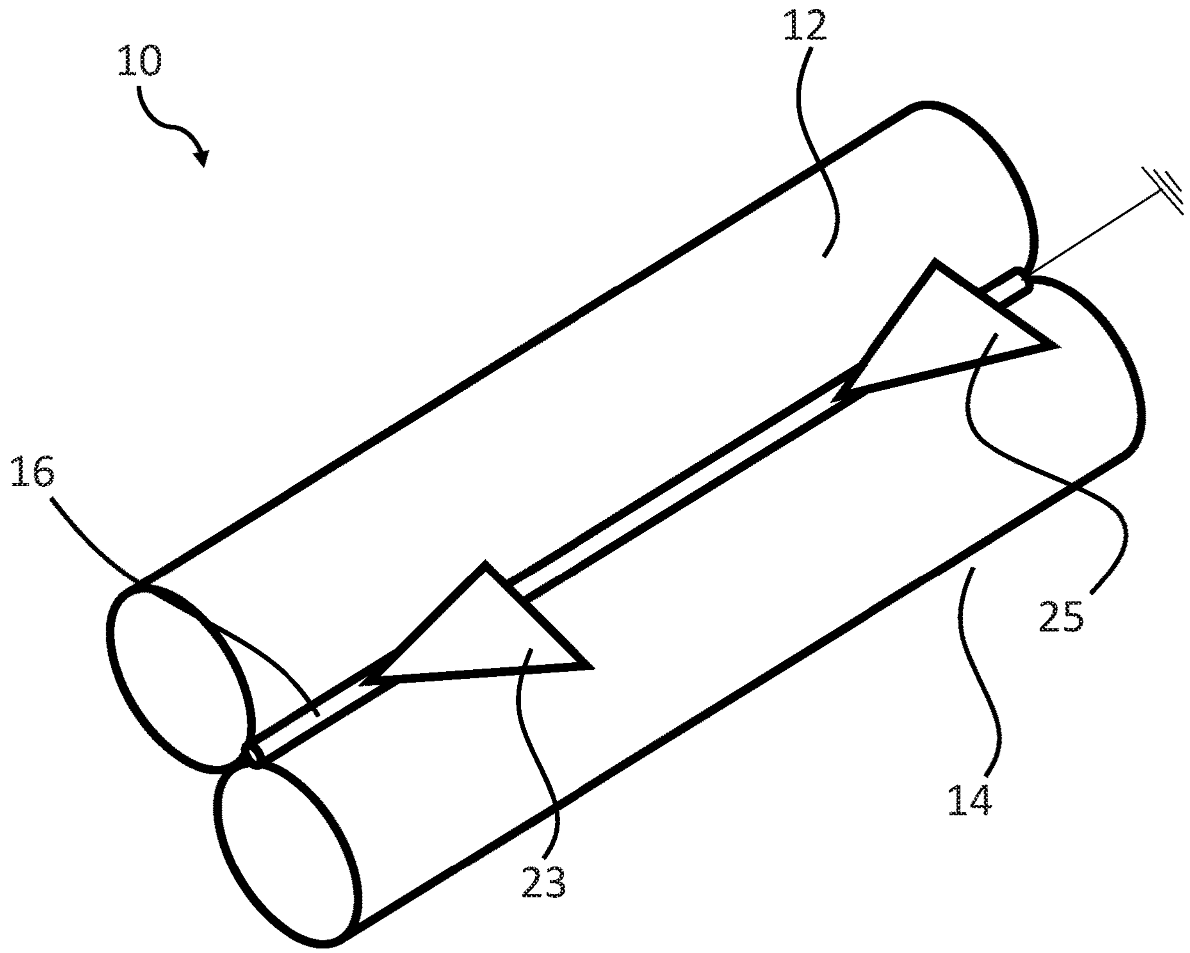
FIG. 2 is a schematic diagram showing a perspective vie of printing apparatus according to an example.

In some examples, such as that of FIG. 2, the electrically conductive member 16 is grounded, which may provide a safe path for corona discharge that may occur between the photo imaging plate 12 and the intermediate transfer member 14 in use. In some examples the electrically conductive member 16 may be held at a third voltage. This may, for example, attract corona discharge to the electrically conductive member 16. The third voltage may be sufficiently large to attract corona discharge to the electrically conductive member 16 without being so large as to cause further corona discharge from the electrically conductive member 16 to the intermediate transfer member 14. In some examples, the third voltage is within 50% of the value of the second voltage, for example within 25% of the value of the second voltage. The electrically conductive member 16 may be held at a third voltage in the region of 0 to 1000V, in the region of 300 to 900V, or in the region of 400-800V. In some examples the third voltage may be similar to the second voltage at which the intermediate transfer member 14 is held, for example a voltage of around 600-650V.

In the example shown schematically in FIG. 1, the photo imaging plate 12 comprises a cylindrical drum rotatable in a first direction indicated by an arrow 18 about a rotational axis. Similarly, in the example of FIG. 1, the intermediate transfer member 14 comprises a cylindrical drum rotatable in a second direction indicated by an arrow 20 about a rotational axis. The second direction is opposite to the first direction, as depicted in FIG. 1. In some examples, the electrically conductive member 16 extends along an axis parallel to the rotational axis of the intermediate transfer member 14, and extend along an axis parallel to the rotational axis of the photo imaging plate 12, with such an example shown schematically in FIG. 2. In the example of FIG. 2, the electrically conductive member 16 extends along the entire length of the intermediate transfer member 14. This may provide protection from corona discharge along substantially the entire length of the intermediate transfer member 14.

In some examples, such as the example of FIG. 2, the electrically conductive member 16 comprises a length and a cross-sectional width, the length more than 100 times the cross-sectional width. In such an example the electrically conductive member 16 comprises a member that is considered elongate, and may have the form of a wire. In some examples, the electrically conductive member 16 may comprise an edge, for example with the electrically conductive member 16 comprising a tear-drop shaped cross-sectional shape. In examples herein, it will be appreciated that a cross-sectional area of the electrically conductive member 16 may be significantly smaller than a cross-sectional area of either the photo imaging plate 12 or the intermediate transfer member 14, and hence that the relative size of the electrically conductive member has been enlarged in the figures to aid understanding.

In some examples, the cylindrical drum of the photo imaging plate 12 is in contact with the cylindrical drum of the intermediate transfer member 14 in a contact region, with the electrically conductive member 16 located adjacent the contact region. One such example is the example shown schematically in FIG. 3, where the electrically conductive member 16 is located adjacent the contact region 22. The contact region 22 is rather small, for example in the region of 50-100 microns along a circumferential direction of the drums when viewed in a direction orthogonal to a rotations axis of the drums, and so it will be appreciated that the scale of FIG. 3 has been exaggerated for ease of understanding.

Figure 3:
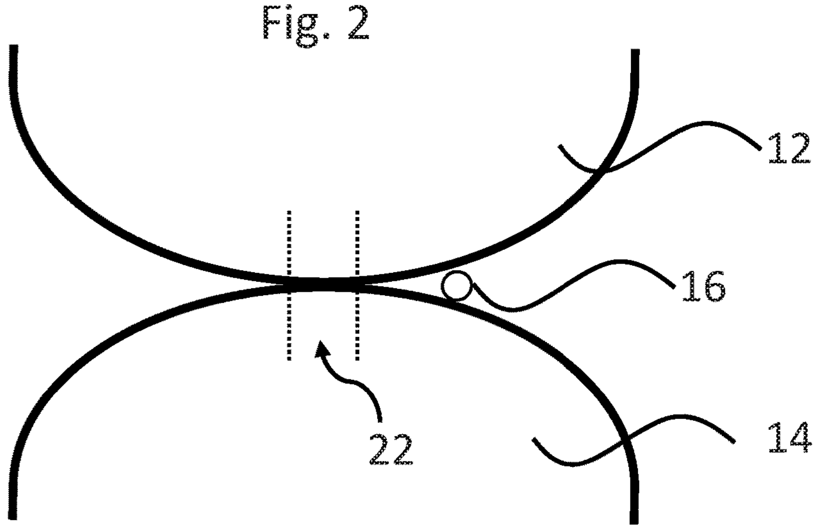
FIG. 3 is a schematic diagram showing an interface between a photo imaging plate and an intermediate transfer member according to an example.

Transfer of the intermediate image from the photo imaging plate to the intermediate transfer member occurs in the contact region 22 in the example of FIG. 3, and hence may also be referred to as an image transfer region. For example, the intermediate image held on the photo imaging plate 12 comprises a first electrical charge in view of the first voltage, and the intermediate transfer member 14 comprises a second electrical charge in view of the second voltage. Transfer of the intermediate image from the photo imaging plate 12 to the intermediate transfer member 14 thereby takes place via both an electromagnetic attraction mechanism and physical contact in the contact region 22.

In some examples, as shown in FIG. 3, the electrically conductive member 16 is held adjacent the contact region 22 by a support structure, the support structure comprising first 23 and second 25 support members spaced apart along the length of the electrically conductive member 16. Utilising spaced apart first 23 and second 25 support members may allow the electrically conductive member 16 to be adequately supported along its length without requiring an intrusive support structure extending across the full length of the electrically conductive member 16. In the example of FIG. 2, the first 23 and second 25 support structures are tapered, which may allow the electrically conductive member 16 to be located closer to the contact region 22 than, for example, a non-tapered arrangement, with the tapered regions able to penetrate further into the airgap between the photo imaging plate 12 and the intermediate transfer member 14. The first 23 and second 25 support structures hold the electrically conductive member 16 in any appropriate manner, provided that the structures are capable of holding the electrically conductive member 16 in position.

As seen in the example of FIG. 3, the electrically conductive member 16 is located between the photo imaging plate 12 and the intermediate transfer member 14 in a region downstream of the contact region 22. A region downstream of the contact region 22 is, as shown in FIG. 3, a region in which the photo imaging plate 12 and the intermediate transfer member 14 are rotating away from the contact region 22. This is in contrast to a region upstream of the contact region 22, which is a region in which the photo imaging plate 12 and the intermediate transfer member 14 are rotating toward the contact region 22. A region downstream of the contact region 22 comprises an airgap between the photo imaging plate 12 and the intermediate transfer member 14 in some examples, such as those shown in FIGS. 1, 2 and 3. For example, pigment particles and any carrier fluid may be compressed in the contact region 22, such that the region downstream of the contact region 22 is relatively dry compared to a region upstream of the contact region 22, which may comprise carrier fluid and pigment particles. Given the relatively high dielectric constant of air, for example compared to a relatively lower dielectric constant of a carrier fluid for pigment particles present in a region upstream of the contact region, corona discharge may be more likely to occur in such an airgap. Thus, the electrically conductive member 16 may be usefully placed in a region downstream of the contact region 22 to mitigate for the effects of corona discharge in use. In some examples the electrically conductive member is located no more than 5%, or no more than 1%, of a value of a circumference of the photo imaging plate 12 away from the contact region 22. In some examples, the electrically conductive member 16 has a diameter of less than 1 mm, for example a diameter in the region of 0.1 mm. Given the relatively small distance from the contact region 22 and the relatively small cross-sectional area of the electrically conductive member, the electrically conductive member 16 may be thought of as being between opposing outer faces of the photo imaging plate 12 and the intermediate transfer member 14.

It will be appreciated that the electrically conductive member 16 may also find utility in a region upstream of the contact region 22 if corona discharge is found to occur in such an upstream region, for example if a carrier fluid is used that has a relatively high dielectric constant. In some examples there may be electrically conductive members located both upstream and downstream of the contact region 22. In some examples there may be a plurality of electrically conductive members located in either or both of regions downstream and upstream of the contact region 22.

In some examples, the printing apparatus 10 comprises an image development unit to deposit print fluid onto the photo imaging plate 12 to form the intermediate image, the print fluid comprising pigment particles suspended in a carrier fluid. The print fluid in some examples, such as those discussed herein, comprises ink, and the intermediate image comprises an inked image. The carrier fluid may comprise an imaging oil. An example print fluid is HP ElectroInk™. In this case, pigment particles are incorporated into a resin that is suspended in a carrier fluid, such as Isopar™. The pigment particles may be electrically charged such that they move when subjected to an electric field. The pigment particles may be negatively charged and are therefore repelled from negatively charged portions of the photo imaging plate 12, and are attracted to discharged portions of the photo imaging plate 12. The carrier fluid may comprise a dielectric constant of 10 or less, which may be sufficient to inhibit corona discharge in a region upstream of the contact region 22.

In some examples, the print fluid comprises an epoxy-based print fluid. The applicant has found that the impact of corona discharge on an intermediate transfer member may be exacerbated when epoxy-based print fluids are used. In particular, corona discharge may cause oxidation of an outer surface of an intermediate transfer member, and the risk of print fluid reaction with the outer surface of the intermediate transfer member may increase with an increased oxidation level since epoxy moieties tend to react with oxidized species (such as peroxides, hydroxyls and carboxyls) at elevated temperatures. Use of the electrically conductive member 16 as disclosed in examples herein may reduce oxidation of an outer surface of the intermediate transfer member 14, which may facilitate use of epoxy-based print fluids.

In some examples, the intermediate transfer member 14 comprises an outer surface formed of polydimethylsiloxane. The applicant has found that an outer surface formed of polydimethylsiloxane may be vulnerable to oxidation as a result of corona discharge, and use of an electrically conductive member 16 as disclosed in examples herein may reduce the risk of oxidation of an outer surface of an intermediate transfer member 14 formed of polydimethylsiloxane.

As previously mentioned, in some examples, the printing apparatus 10 is part of a liquid electrophotographic printer. An example of a liquid electrophotographic printer (LEP) 100 is shown schematically in FIG. 4, with the operation of the LEP 100 described below.

The LEP 100 comprises a photo imaging plate 102, a charging element 104, an imaging unit 106, an image development unit 108, an intermediate transfer member 110, an impression cylinder 112, and an electrically conductive member 114.

Figure 4:
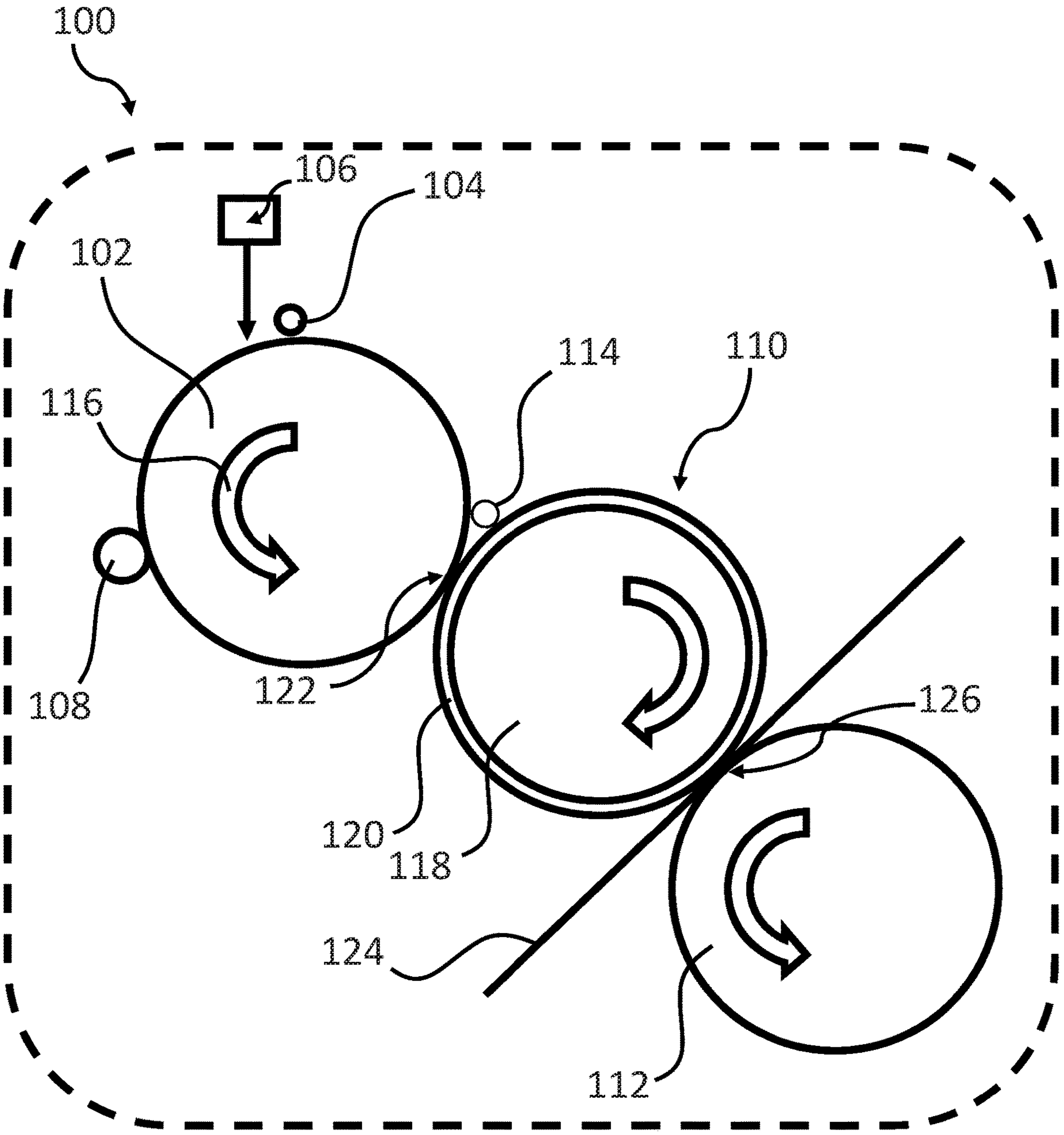
FIG. 4 is a schematic diagram showing a liquid electrophotographic printer according to an example.

In the example of FIG. 4, the photo imaging plate 102 comprises an imaging cylinder rotatable about a central axis in a direction indicated in FIG. 4 by an arrow 116. A latent image is formed on the photo imaging plate 102 by rotating a clean segment of the photo imaging plate 102 under the charging element 104. The charging element 104 may include a charging device, such as corona wire, a charge roller, scorotron, or any other charging device. A uniform static charge is deposited on the photo imaging plate 102 by the charging element 104. Thus, it may be considered that the photo imaging plate is held at a first voltage. In some examples the first voltage is in the region of −900V.

As the photo imaging plate 102 continues to rotate, it passes the imaging unit 106 where one or more lasers dissipate localized charge in selected portions of the photo imaging plate 102 to leave an invisible electrostatic charge pattern, having a significantly lower voltage of around −50V, that corresponds to the image to be printed, i.e. a latent image. Print fluid is then transferred onto the photo imaging plate 102 by the image development unit 108. Although shown in FIG. 4 as having one image development unit 108, it will be appreciated that in practice there may be multiple image development units 108 present, for example one for each colour. An image development unit 108 may also be referred to as a Binary Ink Developer (BID) unit. During printing, the appropriate image development unit 108 is engaged with the photo imaging plate 102. The engaged image development unit 108 presents a uniform film of print fluid to the photo imaging plate 102. The print fluid contains electrically charged pigment particles which are attracted to the image areas of the photo imaging plate 102. The photo imaging plate 102 then has a single colour print fluid image on its surface, i.e. an intermediate image. In some examples the intermediate image is held at −50V.

The print fluid comprises pigment particles suspended in a carrier fluid. An example print fluid is HP ElectroInk™. In this case, pigment particles are incorporated into a resin that is suspended in a carrier fluid, such as Isopar™.

The photo imaging plate 102 continues its rotation to transfer the intermediate image to the intermediate transfer member 110. In the example of FIG. 4, the intermediate transfer member 110 comprises a cylindrical drum 118 and a transfer blanket 120 disposed on the cylindrical drum 118. The transfer blanket 120 is removable and replaceable upon the cylindrical drum 118. In the example of FIG. 4, the transfer blanket 120 comprises a release layer made of silicone rubber, for example, polydimethylsiloxane (PDMS). The transfer blanket 120 is held at a second voltage, which in some examples is in the region of 600-650V. The transfer blanket 120 is in contact with the photo imaging plate 102 in a contact region 122, which may sometimes be referred to as a nip. Transfer of the intermediate image from the photo imaging plate 102 to the transfer blanket 120 takes place in the contact region 122 via electrostatic attraction and physical contact. The transfer of the intermediate image from the photo imaging plate 102 to the intermediate transfer member 110 may be deemed a "first transfer", and so the contact region 122 may be referred to as the T1 nip.

The transfer blanket 120 in the example of FIG. 4 is heated, which causes pigment particles carried on the transfer blanket 120 to partially melt and blend together into a film. The combination of heating and pressure at the contact region 122 may at least partially evaporate the carrier fluid, such that substantially no carrier fluid is located in a region downstream of the T1 nip, i.e. downstream of the contact region 122. In some examples the pigment particles may be alternatively or additionally heated by an external heat source rather than directly heating the transfer blanket 120.

Once the pigment particles are heated and merged into a film, the film is transferred to a substrate 124 at a contact region 126 between the transfer blanket 120 and the impression cylinder 112 to form a printed image on the substrate 124. The impression cylinder 112 both mechanically compresses the substrate 124 into contact with the transfer blanket 120 and also helps feed the substrate 124. The transfer of the film from the transfer blanket 120 to the substrate 124 may be deemed a "second transfer", and so the contact region 126 may be referred to as the T2 nip.

In a similar manner to that discussed above in relation to the example of FIG. 1, due to the large voltage bias between the photo imaging plate 102, for example the intermediate image held on the photo imaging plate 102, and the transfer blanket 120 (for example around 650-700V), corona discharge can occur in the region downstream of the T1 nip, i.e. downstream of the contact region 122, between the photo imaging plate 102 and the transfer blanket 120, where an airgap exists due to a reduced presence of carrier fluid at this location. Such corona discharge does not occur upstream of the T1 nip due to a relatively larger presence of the carrier fluid as part of the intermediate image on the photo imaging plate 102, with the carrier fluid in the example of FIG. 4 being Isopar™, which may have a relatively low dielectric constant of around 2.

As mentioned above, in the example of FIG. 4 the transfer blanket 120 comprises a release layer made of silicone rubber, for example, polydimethylsiloxane (PDMS). The applicant has found that an outer surface of the transfer blanket 120 formed of polydimethylsiloxane may be vulnerable to oxidation as a result of corona discharge, and that may increase the surface tension of an outer surface of the transfer blanket 120 with the number of impressions printed. Consequently, print fluid releaseability from the transfer blanket 120 to the substrate 124 may reduce until replacement of the transfer blanket 120.

Furthermore, the applicant has found that the impact of corona discharge on the transfer blanket 120 may be exacerbated when epoxy-based print fluids are used. In particular, corona discharge may cause oxidation of an outer surface of the transfer blanket 120, and the risk of print fluid reaction with the outer surface of the transfer blanket 120 may increase with an increased oxidation level since epoxy moieties tend to react with oxidized species (such as peroxides, hydroxyls and carboxyls) at elevated temperatures. This may cause print fluid to stick to the transfer blanket 120.

To mitigate the impact of corona discharge on the transfer blanket 120, the electrically conductive member 114 in the example of FIG. 4 is placed in the region downstream of the T1 nip, for example in the region immediately adjacent the contact region 122. The electrically conductive member 114 in the example of FIG. 4 takes the form of a grounded electrically conductive wire, which may intercept corona discharge in the region immediately adjacent the contact region 122, and may inhibit oxidation of the transfer blanket 120.

In some examples the electrically conductive member 114 may be held at a third voltage. This may, for example, attract corona discharge to the electrically conductive member 114. The voltage may be sufficiently large to attract corona discharge to the electrically conductive member 114 without being so large as to cause further corona discharge from the electrically conductive member 114 to the transfer blanket 120. In some examples, the third voltage is within 50% of the value of the second voltage, for example within 25% of the second voltage. The electrically conductive member 114 may be held at a third voltage in the region of 0 to 1000V, in the region of 300 to 900V, or in the region of 400-800V. In some examples the third voltage may be similar to the second voltage at which the transfer blanket is held, for example a voltage of around 600-650V.

Figure 5:
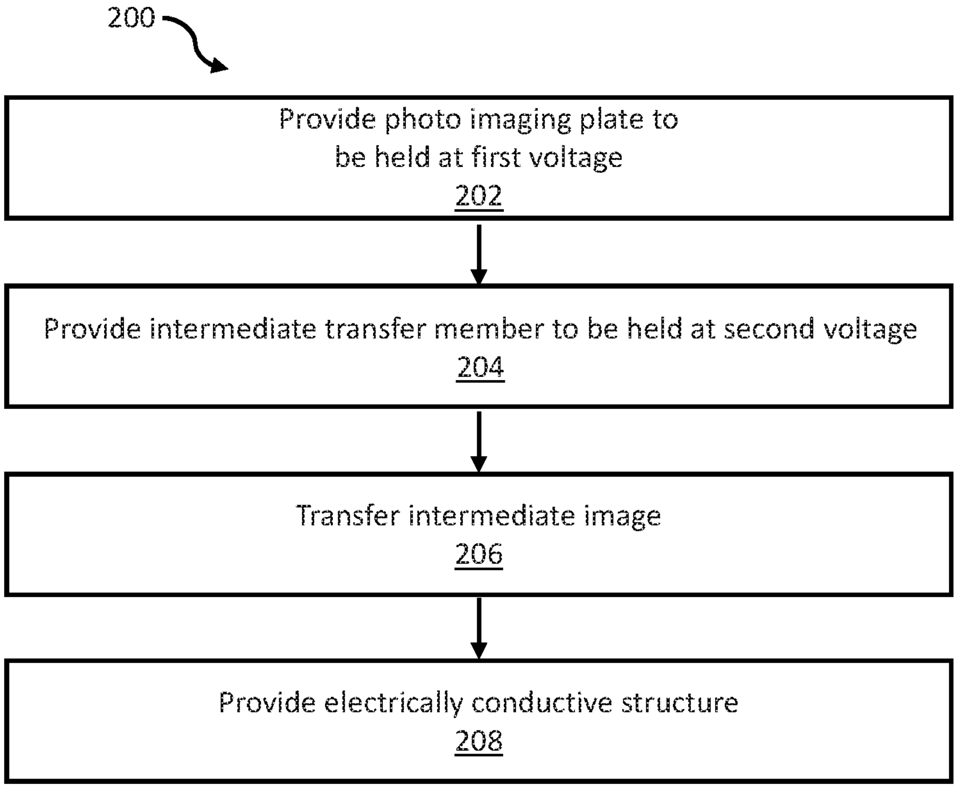
FIG. 5 is a flow chart schematically illustrating a method utilizing a printing apparatus according to an example.

A method 200 that utilises an electrically conductive member as discussed herein is shown schematically in the flow diagram of FIG. 5. The method 200 comprises providing 202 a photo imaging plate held at a first voltage having a first polarity; providing 204 an intermediate transfer member to receive an intermediate image from the photo imaging plate, the intermediate transfer member held at a second voltage having a second polarity opposite to the first polarity; transferring 206 an intermediate image from the photo imaging plate to the intermediate transfer member via an electromagnetic attraction mechanism; and providing 208 an electrically conductive structure located between the photo imaging plate and the intermediate transfer member, whereby the electrically conductive member is to intercept corona discharge between the photo imaging plate and the intermediate transfer member.

Figure 6:
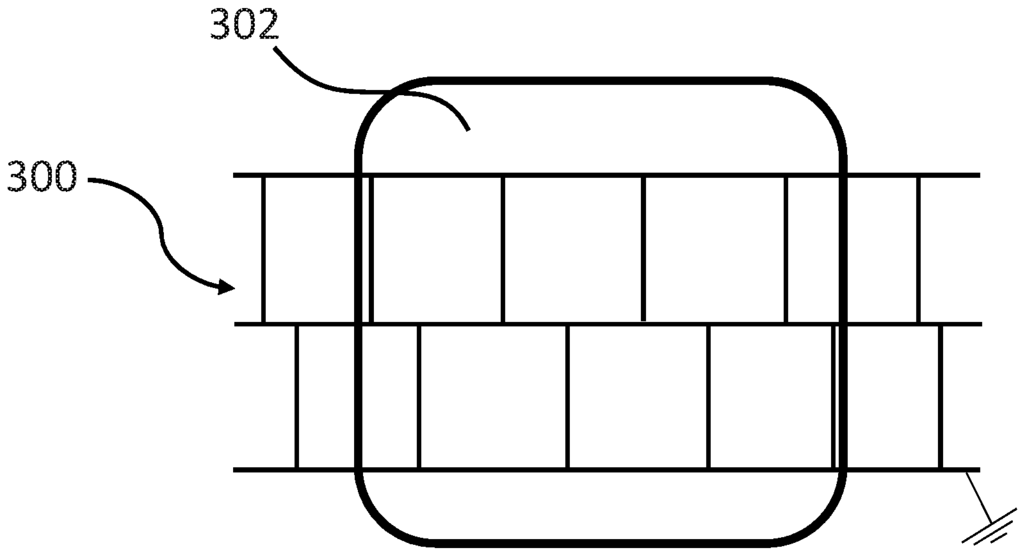
FIG. 6 is a schematic experimental set-up according to an example.

An experimental set-up used to verify the utility of an electrically conductive member as discussed herein will now be discussed with reference to the set-up schematically shown in FIG. 6. As seen in FIG. 6, an electrically conductive mesh 300 was placed above a 10 cm×12 cm rectangular piece of transfer blanket material 302, which in the present example comprises polydimethylsiloxane (PDMS). A manual corona generator was used to apply a manual corona discharge in the region of the electrically conductive mesh, with an application time of 300 s. A similar application of manual corona discharge was applied to a 10 cm×12 cm rectangular piece of transfer blanket material absent the electrically conductive mesh 300. The properties of the treated pieces of transfer blanket material were compared by: i) measuring a water droplet on transfer blanket material contact angle; ii) measuring a di-iodomethane droplet on transfer blanket material contact angle; and iii) measuring a surface energy of the transfer blanket material. The results of the measurements can be seen in Table 1 below for the transfer blanket material absent the electrically conductive mesh, and in Table 2 below for the transfer blanket material 302 with the electrically conductive mesh 300.

TABLE 1

(No Mesh)

| Corona Treatment Duration (s) | Water on blanket contact angle (degrees) | Di-iodomethane on blanket contact angle (degrees) | Surface Energy (mN/m) |
|---|---|---|---|
| 0 | 108 | 79 | 18.49 |
| 300 | 40 | 44 | 62.56 |

TABLE 2

(With Mesh)

| Corona Treatment Duration (s) | Water on blanket contact angle (degrees) | Di-iodomethane on blanket contact angle (degrees) | Surface Energy (mN/m) |
|---|---|---|---|
| 300 | 108 | 79 | 18.62 |

As can be seen from a comparison of Table 1 with Table 2, utilizing an electrically conductive member in the form of the electrically conductive mesh 300 where a manual corona discharge is applied for 300 s provides results substantially similar to the case where no corona discharge is applied. This is in contrast to the case where no electrically conductive mesh is utilised and a manual corona discharge is applied for 300 s.

The impact of the corona discharge on transfer blanket material when utilised with epoxy-based print fluids can be seen from FIGS. 7*a-f*. In particular, after the manual corona discharge was applied, 4 ml of 1.8% NVS yellow print fluid was placed on the treated transfer blanket pieces and heated at 105° C. until total drying of the print fluid. Attempts were then made to remove the print fluid from the transfer blanket material.

Figure 7A:
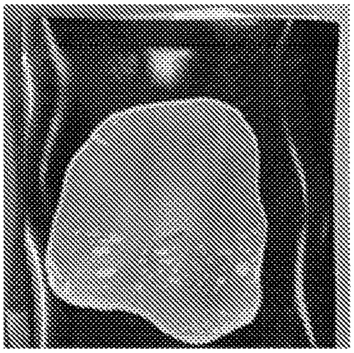
FIG. 7*a* is an image illustrating dried print fluid applied to a transfer blanket material which has not experienced corona discharge.
Figure 7B:
FIG. 7*b* is an image illustrating the transfer blanket material of FIG. 7*a* post-print fluid removal attempt.
Figure 7C:
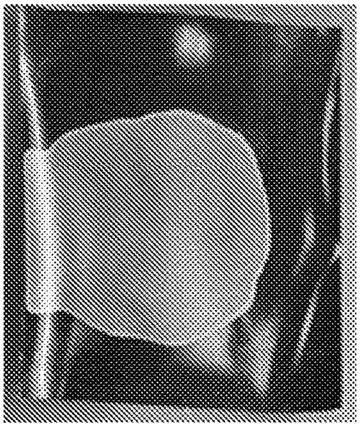
FIG. 7*c* is an image illustrating dried print fluid applied to a transfer blanket material which has experienced corona discharge in the absence of an electrically conductive member.
Figure 7D:
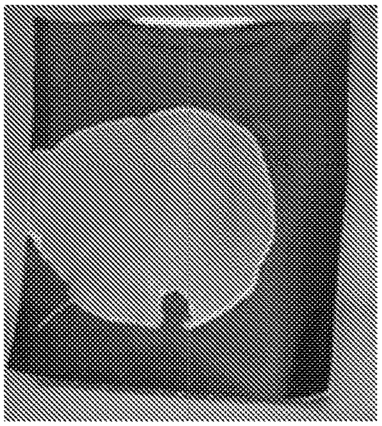
FIG. 7*d* is an image illustrating the transfer blanket material of FIG. 7*c* post-print fluid removal attempt.
Figure 7E:
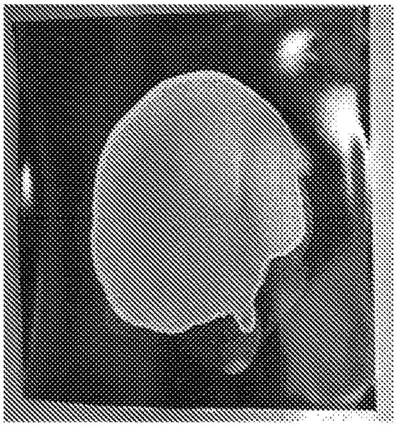
FIG. 7*e* is an image illustrating dried print fluid applied to a transfer blanket material which has experienced corona discharge in the presence of an electrically conductive member.
Figure 7F:
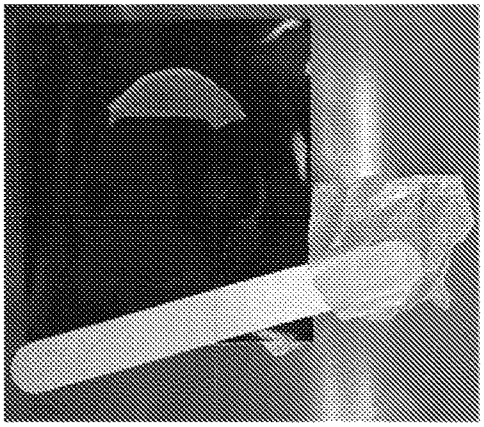
FIG. 7*f* is an image illustrating the transfer blanket material of FIG. 7*e* post-print fluid removal attempt.

As can be seen from FIGS. 7*a* and 7*b*, where no corona discharge was applied, the print fluid was successfully removed from the transfer blanket material. As can be seen from FIGS. 7*c* and 7*d*, where corona discharge was applied in the absence of the electrically conductive mesh 300 for a time duration of 300 s, substantially all of the print fluid remained adhered to the transfer blanket material after removal was attempted. As can be seen from FIGS. 7*e* and 7*f*, where corona discharge was applied in the presence of the electrically conductive mesh 300 for a time duration of 300 s, substantially all of the print fluid was removed from the transfer blanket material in the region of the transfer blanket material that was covered by the electrically conductive mesh 300 after removal was attempted.

From the discussion above, it can be seen that use of an electrically conductive member as disclosed herein may mitigate the effects of corona discharge on a transfer blanket of an intermediate transfer member of an LEP printer.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A printing apparatus comprising:
- a photo imaging plate to be held at a first voltage having a first polarity;
- an intermediate transfer member to receive an intermediate image from the photo imaging plate, the intermediate transfer member to be held at a second voltage having a second polarity opposite to the first polarity; and
- an electrically conductive member disposed between the photo imaging plate and the intermediate transfer member to intercept corona discharge between the photo imaging plate and the intermediate transfer member downstream of an image transfer region between the photo imaging plate and the intermediate transfer member in the direction of the movement of the photo imaging plate.

2. The printing apparatus as claimed in claim 1, wherein the electrically conductive member is electrically grounded.

3. The printing apparatus as claimed in claim 1, wherein the electrically conductive member is held at a third voltage, the third voltage having a value sufficiently large to attract corona discharge to the electrically conductive member without being so large as to cause further corona discharge from the electrically conductive member to the intermediate transfer member.

4. The printing apparatus as claimed in claim 1, wherein the intermediate transfer member is rotatable about a rotational axis, and the electrically conductive member extends along an axis parallel to the rotational axis of the intermediate transfer member.

5. The printing apparatus as claimed in claim 1, wherein the electrically conductive member extends along an entire length of the intermediate transfer member.

6. The printing apparatus as claimed in claim 1, wherein the electrically conductive member is a unitary component.

7. The printing apparatus as claimed in claim 1, wherein the photo imaging plate comprises a first drum rotatable in a first direction, the intermediate transfer member comprises a second drum rotatable in a second direction, the second direction opposite to the first direction, the image transfer region defined in a region of minimal distance between the first drum and the second drum, and the electrically conductive member is located adjacent the image transfer region.

8. The printing apparatus as claimed in claim 7, wherein the electrically conductive member is held adjacent the image transfer region by a support structure, the support structure comprising first and second support members spaced apart longitudinally along a length of the photo imaging plate.

9. The printing apparatus as claimed in claim 1, wherein the intermediate transfer member comprises an outer layer of polydimethylsiloxane.

10. The printing apparatus as claimed in claim 1, wherein the electrically conductive member comprises a length and a cross-sectional width, the length being more than 100 times the cross-sectional width.

11. The printing apparatus as claimed in claim 1, wherein the printing apparatus comprises an image development unit to deposit print fluid onto the photo imaging plate to form an intermediate image, the image development unit comprising print fluid comprising pigment particles suspended in a carrier fluid.

12. The printing apparatus as claimed in claim 11, wherein the carrier fluid comprises a dielectric constant of 10 or less.

13. The printing apparatus as claimed in claim 11, wherein the print fluid comprises an epoxy-based print fluid.

14. A printer comprising:
- an imaging cylinder;
- an image development unit for depositing print fluid on the imaging cylinder to form an intermediate image;
- a blanket to receive the intermediate image from the imaging cylinder at an image transfer region; and
- an electrically conductive wire located between the imaging cylinder and the blanket at a region to intercept corona discharge between the photo imaging plate and the intermediate transfer member downstream of the image transfer region in the direction of the movement of the photo imaging plate.

15. A method comprising:
- providing a photo imaging plate held at a first voltage having a first polarity;
- providing an intermediate transfer member to receive an intermediate image from the photo imaging plate, the intermediate transfer member held at a second voltage having a second polarity opposite to the first polarity;
- transferring an intermediate image from the photo imaging plate to the intermediate transfer member via an electromagnetic attraction mechanism; and providing an electrically conductive structure located between the photo imaging plate and the intermediate transfer member, whereby the electrically conductive structure is to intercept corona discharge between the photo imaging plate and the intermediate transfer member downstream of an image transfer region between the photo imaging plate and the intermediate transfer member in the direction of the movement of the photo imaging plate.

* * * * *